Patented July 22, 1947

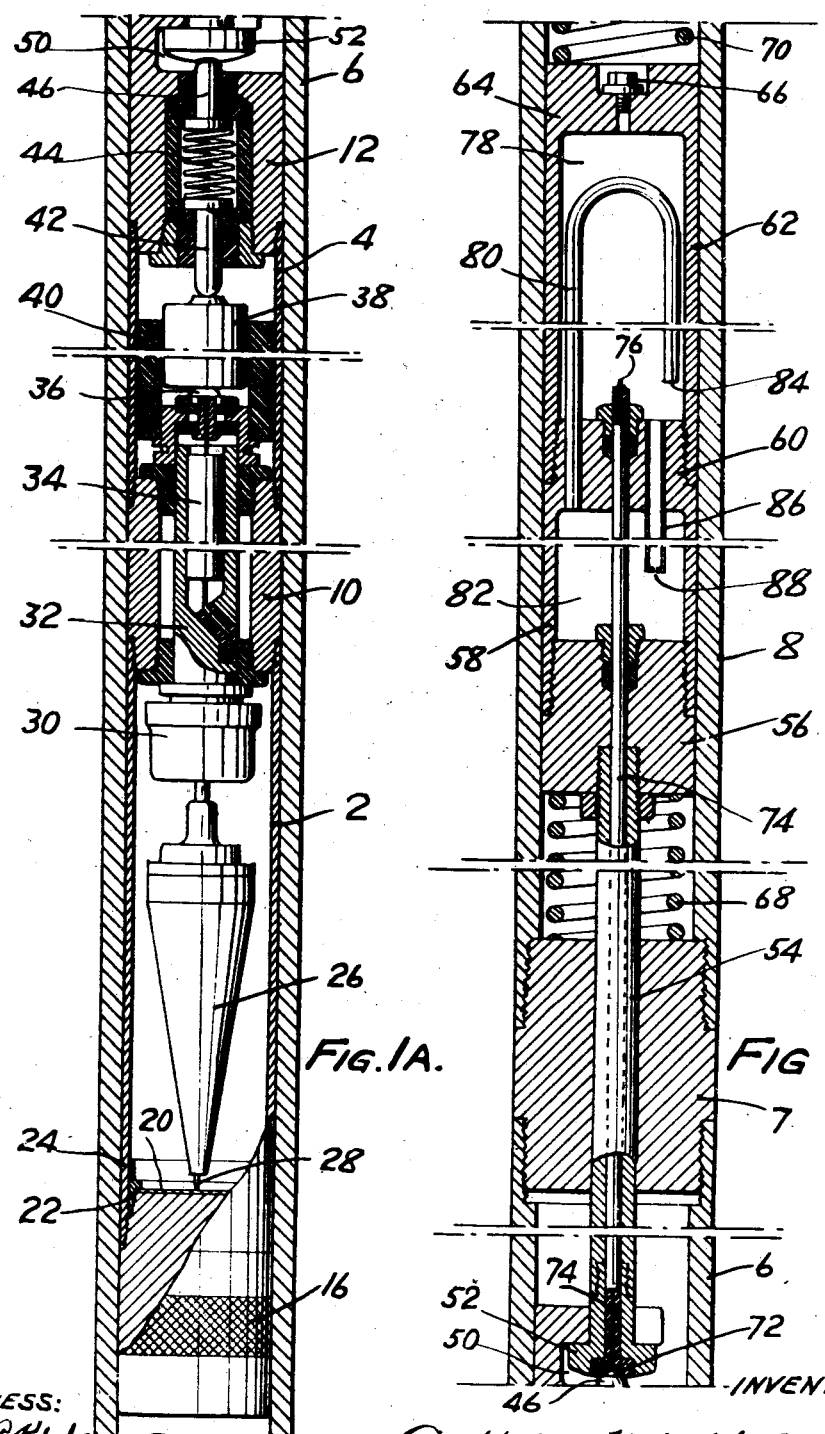

2,424,358

UNITED STATES PATENT OFFICE 2,424,358

WELL SURVEYING DEVICE

Gottdank L. Kothny, Strafford, Pa., assignor to Sperry-Sun Well Surveying Company, Philadelphia, Pa., a corporation of Delaware Application July 22, 1943, Serial No. 495,709

4 Claims. (Cl. 200—33)

This invention relates to a well surveying instrument, and has particular reference to the surveying of bore holes by the so-called go-devil method.

In the patent to Roland Ring 2,246,319, dated June 17, 1941, and in an application of said Roland Ring, Serial Number 379,835, filed February 20, 1941, there are described an instrument and methods of operating the same, which instrument is characterized by a slow and continuous marking action, specifically electrolytic in character, whereby a record of the position of the instrument within a bore hole is made only when the instrument remains stationary for an extended period of time. For a better understanding of the nature of the present invention, which is not, however, limited for its application to said instrument of the above-mentioned patent and application, the operation of said Ring instrument may be described as follows:

If the instrument is run into a bore hole, either within a drill stem or in an open hole, by means of a wire line or cable, the movements of the instrument incidental to its descent into the hole cause a pendulum to move about relative to a record member, so that even though current is continuously flowing from the pendulum to the record member, no point of the record member is exposed to the current action for a sufficiently long time to receive a definite marking. When the instrument reaches the level at which a record of inclination is to be made, it is brought to rest and held in such position for a period of upwards of about one minute, with the result that the electrolytic action is concentrated at one point of the record member and an easily distinguishable spot is made thereon. If it is then desired to make one or more additional records at other levels, the instrument is moved to these successive levels and permitted to remain at them for different periods of time, with the result that marks differing in intensity and/or size are produced which, by their nature, can be identified with the particular levels through a knowledge of the relative times during which the instrument was stationary. Following the completion of the record or records, the instrument is then withdrawn continuously from the hole and in this withdrawing movement, as well as in the periods of movement between the successive recordings, the pendulum will swing relative to the record member so that again no obliterating markings are produced.

In the case of operation of the above type, the instrument is perfectly satisfactory and requires no timing means whatever. However, a common practice in the making of records with other type of surveying instruments involves their being dropped freely through a drill stem so that they come to rest in a position adjacent the bit. During this location in a position of rest, a record is made under the control of suitable timing means and the instrument is then recovered when the bit is brought to the surface for example for the purpose of changing the bit or checking its condition.

In the use of said Ring instrument in go-devil fashion, the motion of the instrument through the drill stem prevents the making of any record during its fall, and a record is then made by holding the drill stem stationary for a sufficient period of time while the instrument rests adjacent the bit. If the drill stem was then raised and dismantled by continuous work of the drilling crew, the instrument would be subject to sufficiently continuous agitation, with only quite limited periods of rest, so that no record obliterating markings would be produced on the record member. However, it is not usual for a derrick crew to work continuously in removing a drill stem from deep holes, and generally speaking, even if some mechanical reason for delay does not occur, the workmen, after raising the drill stem part way, will take a short period of rest before proceeding further. If an instrument of the Ring type is in the drill stem during such a period of rest, or any other period of stationary condition of the drill stem, it will be obvious that another record will be made which might be indistinguishable from the desired record unless a substantially different time of rest is involved, and even then in some rare instances, particularly where the hole is substantially straight, the two records may overlap so that the significance of the original one is lost. It is generally not desirable to rotate the drill stem during such a period of interruption of its withdrawal, and consequently, such rotation is not a practical solution to the problem.

The present invention relates to the provision of means for terminating the recording action of a recording instrument of the Ring or other type at a predetermined desired time.

This, and other objects of the invention, particularly relating to details, will become apparent from the following description read in conjunction with the accompanying drawing in which Figures 1A and 1B are, respectively, longitudinal sectional views through the lower and upper portions of a well surveying instrument embodying the invention.

The instrument illustrated in the drawing is basically of the type disclosed in said Ring application, and comprises an inner casing including the tubular sections 2 and 4 adapted to be located in a fluid-tight protective casing when in use. This protective casing comprises a lower section 6 containing the recording instrument proper connected by a coupling 7 to an upper section 8 which contains a timing device. It will be understood that the ends of the protective casing are closed in conventional fashion so as to provide a structure resistant to the mud pressures encountered in a bore hole.

Referring first to the surveying instrument, the tubes 2 and 4 are joined by a coupling member 10 the upper end of the tube 4 being closed by a top plug 12 engageable as described hereafter with a portion of the timing device.

Threaded into the bottom of the tube 2 is a plug 16 on which may be secured the record member 20 by means of a threaded ring 22 though the record member may be secured in the plug, for example, by depression within a flanged portion thereof. This record member, as described in detail in said Ring patent and application, preferably comprises a sheet of paper containing a colored material such as a colored metallic ferrocyanide which, upon the passage of an electric current while it is moist, will be marked with a white spot by reason of the formation of alkali at a cathode provided by a metallic point 28 slidable within a pendulum 26 mounted for universal pivotal movement in a bearing arrangement 30. An insulating ring 24 prevents short-circuiting by preventing contact of the pendulum with the metallic wall of the tube 2.

The bearing 30 is mounted at the lower end of a cylindrical pin 32 which extends through an opening in the coupling member 10 and is insulated therefrom as indicated. Within 32 is a resistor 34, the lower end of which is soldered within an opening in the member 32 while the upper lead of this resistor is electrically connected to a contact button 36 on which may rest the bottom of the lowermost of a group of batteries 38 arranged in series in flash-light fashion and held within an insulating tube 40. Contact with the positive pole of the uppermost battery is made by means of a metallic pin 42 urged downwardly by a spring 44 which, in turn, makes electrical contact with a plunger 46. The pin 42, spring 44, and plunger 46 are mounted in an insulating insert arrangement within the coupling member 12.

The instrument, to the extent so far described, is essentially the Ring instrument of said patent and application. The closure plug 12 at the upper end of the instrument is provided with a slotted opening 50 which is adapted to be secured to a cooperating element which not only serves to support the instrument within the casing but to continue its electrical circuit to the timing means which will now be described.

The timing device comprises a metal tube 54 the lower end of which carries a head 52 arranged for interengagement with the slotted opening 50 to support the recording instrument. The tube 54 extends slidably through the coupling 7 and is secured to the bottom plug 56 of the timing device which comprises the tubular section 58 closed by the plug 56, and a tubular section 62 closed as indicated at 64 and coupled to the tubular section 58 at 60, the latter forming a partition between the chambers in the upper and lower tubular sections. The closed end 64 of the section 62 is provided with a filling opening closed by a plug 66. Springs 68 and 70 are provided, respectively, above and below the timing assembly as indicated, the spring 68 reacting between the plug 56 and the coupling 7 and the spring 70 located above the top of the section 62 reacting between it and the top closure of the protective casing in the event of abnormal upward movement of the timing section relative to the casing. It will be evident that this arrangement of springs not only mounts the timing assembly in shock-absorbing fashion but does the same for the recording instrument which is suspended upon the head 52 of the tube 54.

Within an insulating insert in the head 52 there is located a contact button 72 which has electrical connection through a conductor located within Bakelite or similar insulating tube 74 with a platinum or similar electrode 76 located in the lower portion of the chamber 78 provided in the tube section 62. The Bakelite tube 74 just referred to extends upwardly through the metallic tube 54 and through the plug 56 and the partition 60 passing through stuffing boxes in both of the latter. It will be evident that by reason of this arrangement the pin 46 is electrically connected to the electrode 76 while both are thoroughly insulated from the metallic parts of the device.

A siphon 80 has its longer leg extending through the partition 60 and opening in the upper portion of the chamber 82 within the tubular section 58, and its shorter leg opening at 84 near the bottom of the chamber 78, for example at about the level of the electrode 76.

Extending also through the partition 60 is a tube 86 which projects below the partition and terminates in a restricted orifice 88 located in the upper end of the chamber 82.

In the operation of the device a liquid is located for flow between chambers 80 and 82 serving to provide a conductive bridge during periods of operation between the electrode 76 and the walls of the chamber 78. As will be evident from the Ring application referred to above, the recording instrument requires for its operation only a very small current flow which is restricted by the high resistance of the record disk and the pendulum contact therewith and by the stabilizing resistor 34 which may have a high value of upwards of 100,000 ohms. It is not essential, therefore, that the liquid used should be any excellent conductor and ordinary tap water is quite sufficiently conductive for the purpose of operation of the Ring type instrument. However, the timer is more generally applicable and if a lower resistance must be provided, the liquid used may be caused to have a low resistance by the incorporation of a metallic salt, for example a copper or silver salt or the like.

In the operation of the instrument, after it is assembled, as indicated in the figures, the electrolyte will normally be solely within the chamber 82. Under such conditions the pendulum circuit will be open when the instrument is upright and, consequently, no recording can take place. Before using the instrument, it is therefore necessary to invert the same, whereupon the electrolyte will flow through the siphon 80 into the chamber 78 air being vented from the chamber 78 into the chamber 82 while air will be vented by way of the orifice 88. During this inversion, however, there will again be no recording because the pin 28 is so arranged as to drop into the pendulum 26 when the recording instrument is inverted.

Upon turning the apparatus again to upright position, the circuit through the pendulum will be completed since the electrolyte will now bridge the gap between the electrode 76 and the ground consisting of the walls of the chamber 78 and the other metallic casing parts of the apparatus. The instrument will, however, not record if it is immediately lowered within a bore hole since as it moves downwardly the pendulum will swing, and since the recording action is slow, no part of the record member will be exposed for a sufficient length of time to the electrolytic action for a visible record to be made or, at any rate, any record which would be indistinguishable from one intentionally made.

As the instrument falls through the bore hole, the electrolyte will slowly run through the orifice 88 into the chamber 82. A difficulty encountered with liquid timers of this type has always been the substantial change in the rate of flow due to the head on an orifice such as 88, the rapid rate of flow at large head necessitating the use of a large quantity of liquid to secure extended times in view of the fact that the orifice must have a certain minimum size not only to insure complete emptying under quite low heads but to avoid the possibility of clogging by dirt and sediment. In the present instance a relatively large orifice is made possible by the maintenance of a substantially constant head thereon throughout the entire period of flow. As flow takes place, air will be vented from the lower chamber 82 through the siphon 80 entering the upper chamber 78 at the bottom 84 of the short leg of the siphon. It will be evident that at the level 84 a pressure exists, despite the height of liquid thereabove, which must be equal to the air pressure in the chamber 82. Consequently, the head upon the orifice 88 is at all times that corresponding to the vertical distance between the orifice 88 and the opening 84 of the siphon. Thus throughout the operation the flow rate is substantially constant and corresponds to this relatively small head. The amount of liquid and the spaces therefor are in this fashion minimized.

The construction of the orifice and the syphon elements of the timing system and the amount of liquid are so arranged that the liquid will not be drained below the level of the electrode 76 to effect breaking of the circuit until such time has elapsed as to insure the attainment of a position of rest by the instrument, for example above the bit on the drill stem, and the making of a single record or a number of records if the latter is desired. In the latter case the instrument is maintained at one level for the making of a first record and, by lifting, the drill stem may be moved to one or more other levels for the purpose of making one or more records distinguishable from the first by maintaining the stationary recording position of the instrument for different periods of time to secure spots or marks of different intensities or areas. In any case, the timing is so adjusted that the circuit will not be interrupted until the last record is completed.

As soon as the electrolyte uncovers the electrode 76, the circuit through the pendulum will be open so that even though the instrument may be at rest for an extended period of time thereafter, no additional records will be made. It is, therefore, possible to interrupt the removal of the drill stem from the hole without losing the desired records by confusion with records subsequently made.

While the timing device has been illustrated as applied to the Ring type of instrument, it will be obvious that it is of general application to break electrical circuits or otherwise interrupt recording action of other types of well surveying instruments, for example such instruments as utilize one or more lamps for photographic recording, and particularly instruments which, like the Ring instrument, depend upon slow recording action for the production of records independently of timing means of a clockwork type. Such an instrument, for example, is illustrated in an application of Smith, Serial Number 399,085, filed June 21, 1941. In the event that heavy currents are required, either liquids of greater conductivity may be used, for example aqueous electrolytes containing metallic salts or mercury; or, alternatively and generally more desirable, the liquid may control the energization of a relay, the contact of which, in turn, may carry much heavier currents.

What is claimed is:

1. An electrical timing means comprising a plurality of superposed chambers, the upper chamber having a closed upper end, means for controlling flow of electrically conductive liquid from the upper chamber into the lower chamber, electrode means in the upper chamber arranged to be uncovered by the liquid upon flow therefrom, and a passage venting the lower chamber to a fixed level in the upper chamber below the level of liquid therein during a major portion of the timing operation, the passage between said chambers consisting solely of said flow controlling means and said venting passage.

2. An electrical timing means comprising a plurality of superposed chambers, the upper chamber having a closed upper end, means for controlling flow of electrically conductive liquid from the upper chamber into the lower chamber, electrode means in the upper chamber arranged to be uncovered by the liquid upon flow therefrom, and a siphon venting the lower chamber to a fixed level in the upper chamber below the level of liquid therein during a major portion of the timing operation, the passages between said chambers consisting solely of said flow controlling means and said siphon.

3. An electrical timing means comprising a plurality of superposed chambers, the upper chamber having a closed upper end, an orifice for controlling flow of electrically conductive liquid from the upper chamber into the lower chamber, electrode means in the upper chamber arranged to be uncovered by the liquid upon flow therefrom, and a passage venting the lower chamber to a fixed level in the upper chamber below the level of liquid therein during a major portion of the timing operation, the passages between said chambers consisting solely of said orifice and said venting passage.

4. An electrical timing means comprising a plurality of superposed chambers, the upper chamber having a closed upper end, an orifice for controlling flow of electrically conductive liquid from the upper chamber into the lower chamber, electrode means in the upper chamber arranged to be uncovered by the liquid upon flow therefrom, and a siphon venting the lower chamber to a fixed level in the upper chamber below the level of liquid therein during a major portion of the timing operation, the passages between said chambers consisting solely of said orifice and said siphon.

GOTTDANK L. KOTHNY.

REFERENCES CITED

The following references are of record in the file of this patent:

UNITED STATES PATENTS

| Number | Name | Date |
| --- | --- | --- |
| 2,232,880 | Gehrand | Feb. 26, 1941 |
| 2,240,417 | Ring | Apr. 29, 1941 |
| 2,318,612 | Kothny | May 11, 1943 |
| 2,246,319 | Ring | June 17, 1941 |
| 1,977,630 | Hester | Oct. 23, 1934 |
| 2,301,757 | Smith | Nov. 10, 1942 |